United States Patent
Ozawa et al.

(10) Patent No.: US 6,793,799 B2
(45) Date of Patent: Sep. 21, 2004

(54) METHOD OF SEPARATING AND RECOVERING RARE FP IN SPENT NUCLEAR FUELS AND COOPERATION SYSTEM FOR NUCLEAR POWER GENERATION AND FUEL CELL POWER GENERATION UTILIZING THE SAME

(75) Inventors: Masaki Ozawa, Higashi-Ibaraki-gun (JP); Yuichi Sano, Naka-gun (JP); Yoshihiko Shinoda, Higashi-Ibaraki-gun (JP)

(73) Assignee: Japan Nuclear Cycle Development Institute, Ibaraki-Ken (JP)

( * ) Notice: Subject to any disclaimer, the term of this patent is extended or adjusted under 35 U.S.C. 154(b) by 156 days.

(21) Appl. No.: 10/157,236

(22) Filed: May 30, 2002

(65) Prior Publication Data

US 2003/0099322 A1 May 29, 2003

(30) Foreign Application Priority Data

Nov. 28, 2001 (JP) ........................................ 2001-362251

(51) Int. Cl.[7] ............................. C25C 1/24; C25F 3/00; G21C 19/46
(52) U.S. Cl. ...................................... 205/559; 205/685
(58) Field of Search .................................. 205/559, 685

(56) References Cited

U.S. PATENT DOCUMENTS

| | | | | |
|---|---|---|---|---|
| 3,890,244 A | * | 6/1975 | Carlin | .......................... 423/2 |
| 3,891,741 A | * | 6/1975 | Carlin et al. | .................. 206/43 |
| 3,922,231 A | * | 11/1975 | Carlin et al. | .................... 423/2 |
| 4,056,482 A | * | 11/1977 | Schmieder et al. | ......... 205/688 |
| 4,297,179 A | * | 10/1981 | Skomoroski | ................ 205/143 |
| 5,190,623 A | * | 3/1993 | Sasaki et al. | ............... 205/553 |
| 5,250,166 A | * | 10/1993 | Motojima et al. | .......... 204/222 |
| 5,894,077 A | * | 4/1999 | Jones et al. | .................. 588/204 |

FOREIGN PATENT DOCUMENTS

| | | | | |
|---|---|---|---|---|
| JP | 2997266 B | | 10/1999 | |
| JP | 2000-227497 A | * | 8/2000 | ........... G21C/19/46 |

* cited by examiner

Primary Examiner—Roy King
Assistant Examiner—Harry D Wilkins, III
(74) Attorney, Agent, or Firm—Wenderoth, Lind & Ponack, L.L.P.

(57) ABSTRACT

A method of separating and recovering useful rare FP contained in spent nuclear fuels (platinum group element (Ru, Rh, Pd), Ag, Tc, Se, Te) selectively and at high recovery percentage is provided. Nitric acid solution to be processed containing useful rare FP in spent nuclear fuels is electrolytically reduced by using $Pd^{2+}$ or $Fe^{2+}$ as a catalyst and rare FP are collectively deposited on an electrode and then deposits on the electrode are collectively dissolved by electrolytic oxidation. Then, the deposit-dissolved solution is electrolytically reduced at low current density, medium current density and high current density, successively, whereby Ag.Pd group, Se.Te group and Ru.Rh.Tc group are separately deposited and recovered, group by group. A cooperation system for nuclear power generation and fuel cell power generation can be provided by utilizing the recovered rare FP as electrode materials and production and purification catalysts for hydrogen fuel in fuel cell.

4 Claims, 5 Drawing Sheets

METHOD OF SEPARATING AND RECOVERING RARE FP IN SPENT NUCLEAR FUELS AND COOPERATION SYSTEM FOR NUCLEAR POWER GENERATION AND FUEL CELL POWER GENERATION UTILIZING THE SAME

BACKGROUND OF THE INVENTION

The present invention relates to a method of efficiently and selectively separating and recovering rare FP (fission products), group by group, from a nitric acid solution containing these rare FP generated from a reprocessing step of spent nuclear fuels used in nuclear power generation facilities including light water reactors and fast reactors. Further, it relates to a system for cooperation of the nuclear power generation and the fuel cell power generation by utilizing the recovered rare FP to technical fields relating with the fuel cell power generation.

In the present specification, "rare FP" is used as a term including FP of rare metal elements such as platinum group elements (Ru (ruthenium), Rh (rhodium) and Pd (palladium)), Ag (silver), Tc (technetium), Se (selenium) and Te (tellurium).

Nitric acid solutions or radioactive process liquid wastes generated from reprocessing plants for spent nuclear fuels used in light water reactors or fast reactors contain a considerable amount of useful rare FP and, as a method of separating and recovering such rare FP, "a method of separating and recovering platinum group elements, technetium, tellurium and selenium" has been proposed, for example, by Japanese Patent No. 2997266.

This prior art method comprises electrolyzing at a constant current a nitric acid solution (for example, a nitric acid solution generated from spent nuclear fuel reprocessing plants) containing one or more of elements selected from the group consisting of platinum group elements other than Pd (such as Ru, Rh and the like), Tc, Te and Se under the coexistence of $Pd^{2+}$ and depositing these elements by electrolytic reduction on a cathode. In the case where a nitric acid solution containing Pd as the platinum group element is processed, there is no requirement of positively adding $Pd^{2+}$. The metal elements deposited on the cathode are successively dissolved, element by element, and separately recovered, by replacing the solution to be processed in a cathode chamber with a pure nitric acid solution and controlling the electrode potential to that corresponding to the aimed element.

In the above-described prior art method of separating and recovering the rare FP, platinum group FP (Pd, Ru, Rh) deposited as solid solutions on the electrode can be separately dissolved on the basis of the difference in the dissolution potential, in principle, by controlling the dissolution potential corresponding to each of the elements. In fact, however, the method of controlling the potential involves a problem that it is difficult to maintain the reaction rate constant or that the structure for an electrolysis vessel is complicated and thus the prior art method can not be always considered as a satisfactory separation and recovery method with a engineering view point of electrolytic operation.

However, when useful rare FP contained in spent nuclear fuels can be separated and recovered selectively at a high recovery percentage, a considerable portion for the amount required to be collected and supplied from natural rare element resources can be substituted and it is possible to preserve definite natural reserves.

Furthermore, Pd, Ru and Rh as useful rare FP contained in the spent nuclear fuels have a high catalytic activity and it is expected that the demand therefor will be increased in near feature as electrode materials or as a catalyst for production and purification of fuel hydrogen for use in fuel cells.

SUMMARY OF THE INVENTION

An object of the present invention is therefore to provide a method capable of separating and recovering useful rare FP contained in spent nuclear fuels selectively and at a high recovery percentage.

Another object of the present invention is to provide a cooperation system for nuclear power generation and fuel cell power generation by utilizing the thus recovered useful rare FP as electrode materials and a catalyst for production and purification of fuel hydrogen for use in fuel cells.

The inventors of the present invention have made an earnest study with an aim of providing a method of separating and recovering useful rare FP contained in spent nuclear fuels which does not rely on an electrolysis operation at a constant potential as in the prior art method described above, and which can efficient separation and recovery of rare FP by combining operation parameters for current density and nitric acid concentration, even in the case of utilizing an electrolysis operation at a constant current which is relatively simple and convenient in view of operation and can be simplified also in view of the structure of an electrolysis vessel. Consequently, the inventors have accomplished the present invention based on the finding that separation and recovery is possible by electrolytically reducing a nitric acid solution to be processed containing useful rare FP in spent nuclear fuels using $Pd^{2+}$ or $Fe^{2+}$ as a catalyst, collectively depositing the rare FP on an electrode, then collectively dissolving the deposits on the electrode by electrolytic oxidation and then electrolytically reducing the solution containing dissolved deposits therein at low current density, medium current density and high current density, successively, whereby Ag.Pd group, Se.Te group and Ru.Rh.Tc group are separately deposited and recovered, group by group.

According to the present invention, there is provided a method of separating and recovering rare FP in spent nuclear fuels comprising:

a step A of supplying a nitric acid solution to be processed at a nitric acid concentration of 0.1 to 4.5 M containing one or more of rare FP selected from the group consisting of platinum group elements, Ag (silver), Tc (technetium), Se (selenium) and Te (tellurium) generated from a reprocessing step of spent nuclear fuels used in nuclear power generation facilities including light water reactors or fast reactors, to a cathode chamber together with $Pd^{2+}$ (palladium) or $Fe^{2+}$ (iron) as a catalyst, and conducting electrolytic reduction at a current density of 1 to 3000 $mA/cm^2$ while supplying a pure nitric acid solution at a nitric acid concentration of 0.1 to 4.5 M to an anode chamber, thereby collectively depositing Ru (ruthenium), Rh (rhodium) and Pd as platinum group elements, and Ag, Tc, Se and Te in the nitric acid solution to be processed on the cathode;

a step B of switching the cathode to the anode and conducting electrolytic oxidation at a set potential of 1.5 to 3 V while supplying a pure nitric acid solution at a nitric acid concentration of 3 to 5 M, thereby collectively dissolving the deposits on the electrode into the pure nitric acid solution;

a step C of switching the anode to the cathode, and conducting electrolytic reduction at a current density of 1 to 25 mA/cm$^2$ while supplying the deposit-dissolved nitric acid solution at a nitric acid concentration of 0.1 to 4.5 M to the cathode chamber and supplying a pure nitric acid solution at a nitric acid concentration of 0.1 to 4.5 M to the anode chamber, thereby selectively depositing Pd and Ag in the deposit-dissolved nitric acid solution on the cathode;

a step D of switching the cathode to the anode and conducting electrolytic oxidation at a set potential of 1.5 to 3 V while supplying a pure nitric acid solution at a nitric acid concentration of 3 to 5 M, thereby dissolving the deposits Pd and Ag on the electrode into the pure nitric acid solution and recovering them;

a step E of switching the anode to the cathode, and conducting electrolytic reduction at a current density of 25 to 100 mA/cm$^2$ while supplying the deposit-dissolved and Pd.Ag-removed nitric acid solution at a nitric acid concentration of 0.1 to 4.5 M to the cathode chamber and supplying a pure nitric acid solution at a nitric acid concentration of 0.1 to 4.5 M to the anode chamber, thereby selectively depositing Se and Te in the deposit-dissolved and Pd.Ag-removed nitric acid solution on the cathode;

a step F of switching the cathode to the anode and conducting electrolytic oxidation at a set potential of 1.5 to 3 V while supplying a pure nitric acid solution at a nitric acid concentration of 3 to 5 M, thereby dissolving the deposits Se and Te on the electrode into the pure nitric acid solution and recovering them;

a step G of switching the anode to the cathode, and conducting electrolytic reduction at a current density of 100 to 700 mA/cm$^2$ while supplying the deposit-dissolved and Pd.Ag.Se.Te-removed nitric acid solution at a nitric acid concentration of 0.1 to 4.5 M to the cathode chamber and supplying a pure nitric acid solution at a nitric acid concentration of 0.1 to 4.5 M to the anode chamber, thereby selectively depositing Ru, Rh and Tc in the deposit-dissolved and Pd.Ag.Se.Te-removed nitric acid solution on the cathode; and a step H of switching the cathode to the anode and conducting electrolytic oxidation at a set potential of 1.5 to 3 V while supplying a pure nitric acid solution at a nitric acid concentration of 3 to 5 M, thereby dissolving deposits Ru, Rh and Tc on the electrode into the pure nitric acid solution and recovering them.

According to the present invention, there is also provided a cooperation system for nuclear power generation and fuel cell power generation utilizing the rare FP separated and recovered by the above-described method to the following fuel cell power generation technique.

Ru and Rh are utilized as a catalyst for production of fuel hydrogen for use in fuel cells.

Ru and Rh are utilized as an electrode catalyst for use in fuel cells.

Pd is utilized as a catalyst for purification of fuel hydrogen for use in fuel cells.

Pd is utilized as a Mg—Pd laminated alloy for a hydrogen absorbing alloy absorbing fuel hydrogen for use in fuel cells.

A most preferred embodiment in the cooperation system for nuclear power generation and fuel cell power generation according to the present invention is to supply an electric power generated by nuclear power generation facilities including light water reactors or fast reactors as an electric power for production of fuel hydrogen for use in fuel cells, apply the separation and recovery method described above to the rare FP in spent nuclear fuels used in the nuclear power generation facilities and utilize the recovered Ru, Rh and Pd as a catalyst for production and purification of fuel hydrogen for use in fuel cells or as an electrode catalyst for use in fuel cells.

PREFERRED EMBODIMENTS OF THE INVENTION

Figure 1:
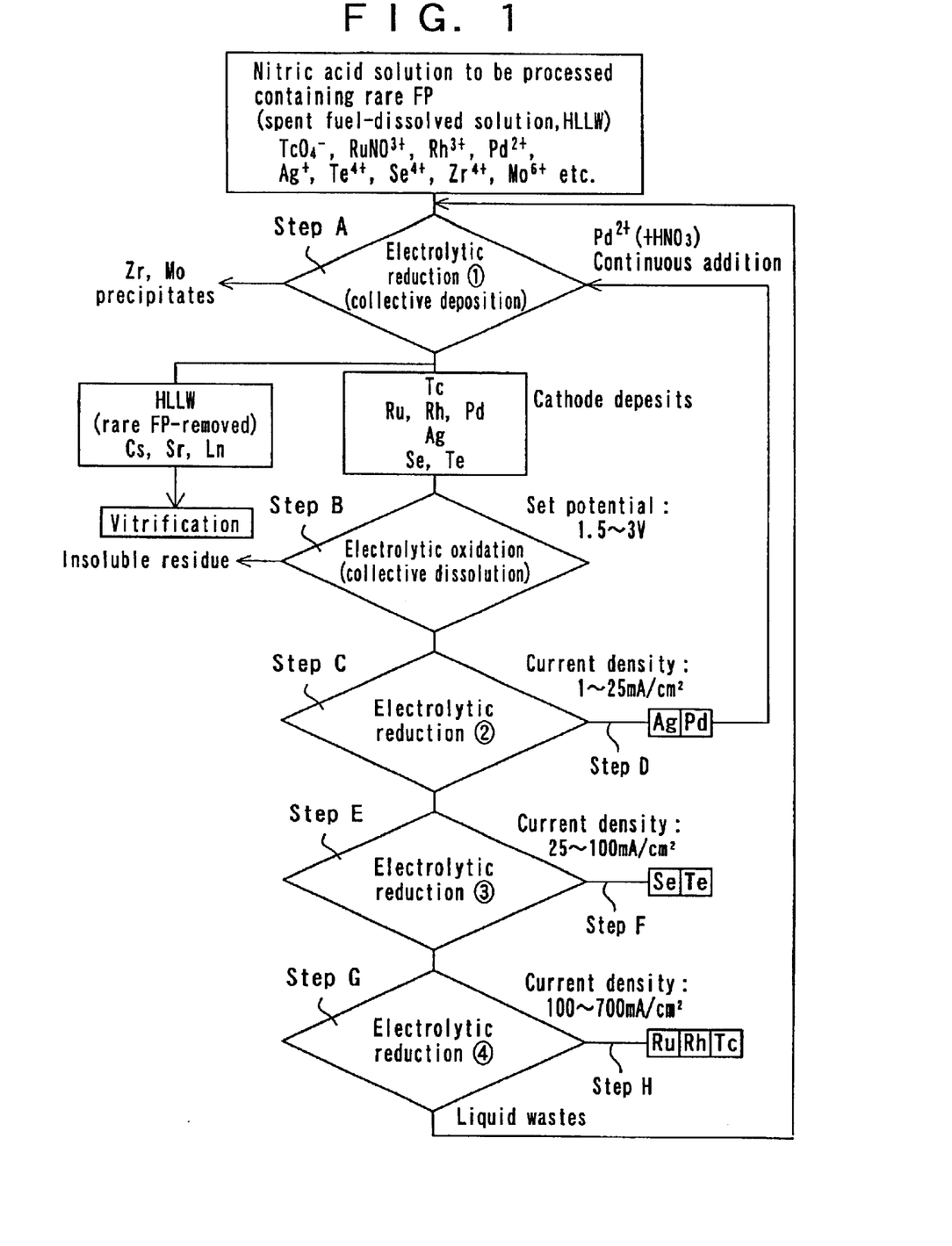
FIG. 1 is a flow chart for the method of separating and recovering rare FP in spent nuclear fuels according to the present invention.
Figure 2:
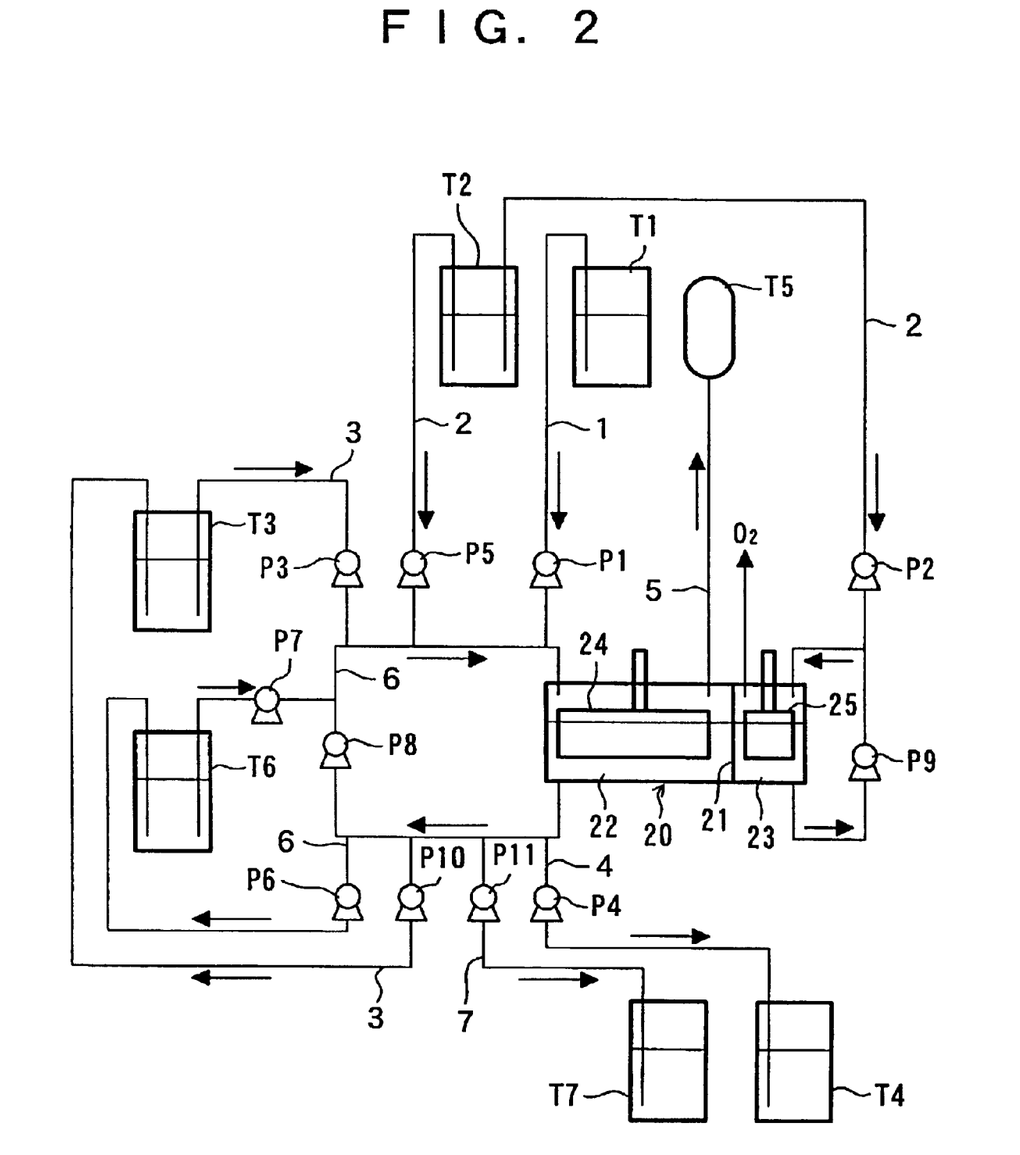
FIG. 2 is a schematic view showing an example of an electrolysis apparatus used for practicing the method of separating and recovering rare FP according to the present invention.

FIG. 1 is a flow chart for the method of separating and recovering rare FP in spent nuclear fuels according to the present invention and FIG. 2 is a schematic view showing an example of an electrolysis apparatus used for practicing the method. Now, each of the steps in the method of the present invention shown in FIG. 1 is to be explained with reference to the schematic view for the electrolysis apparatus of FIG. 2.

<Step A>

The nitric acid solution to be processed containing rare FP which is processed by the method of the present invention includes nitric acid solutions or high level liquid wastes generated upon reprocessing of spent nuclear fuels in power generating nuclear reactors such as light water reactors and fast reactors. In the illustrated example, the nitric acid solution to be processed includes spent nuclear fuel-dissolved solutions and high level liquid wastes (HLLW) containing $TcO_4^-$, $RuNO^{3+}$, $Rh^{3+}$, $Pd^{2+}$, $Ag^+$, $Te^{4+}$, $Se^{4+}$, $Zr^{4+}$, $Mo^{6+}$ and the like as the rare FP.

A flow type electrolysis vessel 20 in FIG. 2 is partitioned by means of a diaphragm 21 into a cathode chamber 22 and anode chamber 23, in which a cathode 24 and an anode 25 are disposed, respectively. As the material for the electrolysis vessel and the electrodes, any of materials used conventionally so far can be used so long as they have acid resistance and radiation resistance. For example, metals or plastics (PTFE, etc.) can be used as the material for the electrolysis vessel and stainless steel, platinum, platinum-plated or coated titanium, graphite and the like can be used as the material for the electrodes. Further, as the material for the diaphragm, perfluoro series sulfonic acid type ion exchange membrane, porous glass or ceramics can be used.

A predetermined amount of the solution 1 to be processed (nitric acid concentration: 0.1 to 4.5 M) from a tank T1 is charged by a pump P1 to the cathode chamber 22 of the electrolysis vessel and a predetermined amount of a pure nitric acid solution 2 (nitric acid concentration: 0.1 to 4.5 M) from a tank T2 is charged by a pump P2 to the anode chamber 23 of the electrolysis vessel, and then electrolysis reduction ① is started. The current density is set at 1 to 3,000 mA/cm².

During electrolysis, a nitric acid solution 3 of $Pd^{2+}$ as the catalyst is added from a tank T3 by a pump P3 to the solution 1 to be processed and continuously supplied to the cathode chamber 22 of the electrolysis vessel, and the cathode solution after electrolysis is occasionally extracted as a processed solution 4 (from which rare FP have been removed) by a pump P4 to a tank T4. Further, hydrogen 5 evolved from the cathode solution during electrolysis is recovered in a tank T5. As the catalyst, $Fe^{2+}$ which is less expensive than $Pd^{2+}$ can also be used.

The rare FP as an object to be separated in the solution 1 to be processed are entirely deposited on the cathode 24 (collective deposition) by the electrolytic reduction ① and separated selectively from other FP (Cs, Sr, lanthanoids (Ln), etc.). The processed solution 4 from which the rare FP have been removed is vitrified and stored for a long time.

Since Zr and Mo in the solution 1 to be processed can also be recovered as precipitates by lowering the nitric acid concentration of the nitric acid solution 3 added together with $Pd^{2+}$ in the electrolytic reduction ①, Zr and Mo in high level liquid wastes to be vitrified can be reduced, to contribute to the improvement of the vitrifying operation.

<Step B>

After the completion of the step A, the cathode 24 is switched to the anode, and a pure nitric acid solution 2 (nitric acid concentration: 3 to 5 M) is supplied continuously from the tank T2 by a pump P5 to conduct electrolytic oxidization at a set potential of 1.5 to 3 V, to thereby dissolve rare FP as deposits on the electrode 24 entirely into the pure nitric acid solution 2 (collective dissolution). Insoluble rare FP that are not dissolved in this step remain on the electrode as an insoluble residue. The pure nitric acid solution containing rare FP deposits dissolved therein are occasionally recovered as a deposit-dissolved nitric acid solution 6 by a pump P6 to a tank T6.

<Step C>

After switching the anode to the cathode again, the deposit-dissolved nitric acid solution 6 recovered in the tank T6 is adjusted to a nitric acid concentration of 0.1 to 4.5 M and circulated between the cathode chamber 22 of the electrolysis vessel and the tank T6 by pumps P7 and P8, and the pure nitric acid solution 2 (nitric acid concentration: 0.1 to 4.5 M) of the anode chamber 23 is circulated by a pump P9 and electrolytic reduction ② is carried out at a current density of 1 to 25 mA/cm². By the electrolytic reduction at such a low current density, only Pd and Ag in the solution 6 can be deposited on the cathode 24. Hydrogen 5 evolved from the cathode solution during electrolysis is recovered in the tank T5.

In the step C, by conducting electrolytic reduction ② with the addition of a reducing agent such as hydroxylamine nitrate ($NH_3OH^+$ (HAN)) or hydrazine ($N_2H_5NO_3$ or $N_2H_5OH$) to the deposit-dissolved nitric acid solution 6, deposits of Pd and Ag can be promoted selectively to improve the purity of deposited Pd and Ag.

<Step D>

After completion of the step C, the cathode 24 is switched to the anode, the pure nitric acid solution 2 (nitric acid concentration: 3 to 5 M) is continuously supplied from the tank T2 by the pump P5 and electrolytically oxidized at a set potential of 1.5 to 3 V to dissolve Pd and Ag as deposits on the electrode 24 into the pure nitric acid solution 2. The Pd, Ag-dissolved nitric acid solution is occasionally recovered by a pump P10 as $Pd^{2+}$, $Ag^+$+ nitric acid solution 3 to the tank T3 and added from the tank T3 into the high level liquid wastes processed in the step A as $Pd^{2+}$+ nitric acid solution 3 as a catalyst.

Since the amount of Ag recovered together with Pd in this step D is negligible compared with Pd, it does not hinder the catalytic effect of $Pd^{2+}$ when circulated together with Pd to the step A.

<Step E>

After switching the anode to the cathode again, the deposit-dissolved nitric acid solution 6 (nitric acid concentration: 0.1 to 4.5 M) recovered in the tank T6 after removing Pd and Ag in the step C is circulated between the cathode chamber 22 of the electrolysis vessel and the tank T6 by the pumps P7 and P8, and the pure nitric acid solution 2 (nitric acid concentration: 0.1 to 4.5 M) in the anode chamber 23 is circulated by the pump P9 and electrolytic reduction ③ is carried out at a current density of 25 to 100 mA/cm². By electrolytic reduction at such a medium current density, only Se and Te in the solution 6 can be deposited on the cathode 24. Hydrogen 5 evolved from the cathode solution during electrolysis is recovered in the tank T5.

<Step F>

After the completion of the step E, the cathode 24 is switched to the anode, the pure nitric acid solution 2 (nitric acid concentration: 3 to 5 M) is continuously supplied from the tank T2 by the pump P5 and electrolytically oxidized at a set potential of 1.5 to 3 V to dissolve Se and Te as deposits on the electrode 24 into the pure nitric acid solution 2. The Se, Te-dissolved nitric acid solution 7 is occasionally recovered by a pump P11 to a tank T7.

<Step G>

After switching the anode to the cathode again, the deposit-dissolved nitric acid solution 6 (nitric acid concentration: 0.1 to 4.5 M) recovered in the tank T6 after removing Se and Te in the step F is circulated between the cathode chamber 22 of the electrolysis vessel and the tank T6 by the pumps P7 and P8, and the pure nitric acid solution 2 (nitric acid concentration: 0.1 to 4.5 M) of the anode chamber 23 is circulated by the pump P9 and electrolytic reduction ④ is carried out at a current density of 100 to 700 mA/cm². By electrolytic reduction at such a high current density, $H^+$ is removed as $H_2$ from the solution 6 and Ru, Rh and Tc in the solution 6 can be deposited efficiently on the cathode 24. Hydrogen 5 evolved from the cathode solution during electrolysis is recovered in the tank T5.

The liquid wastes of the processed solution from which Ru, Rh and Tc have been deposited and removed by electrolytic reduction ④ are circulated to the step A and subjected to the electrolytic reduction ① together with the solution 1 to be processed containing the rare FP.

<Step H>

After the completion of the step G, the cathode 24 is switched to the anode, the pure nitric acid solution 2 (nitric acid concentration: 3 to 5 M) is continuously supplied from the tank T2 by the pump P5 and electrolytically oxidized at a set potential of 1.5 to 3 V to dissolve Ru, Rh and Tc as deposits on the electrode 24 into the pure nitric acid solution 2. The Ru, Rh and Tc-dissolved nitric acid solution 7 is occasionally recovered by the pump P11 to the tank T7.

Although not illustrated, when a highly radioactive nitric acid solution to be processed such as high level liquid wastes is electrolytically processed, a hydrogen gas is evolved from the nitric acid solution to be processed per se by radiolysis. Such a hydrogen gas formed by the radiolysis is also recovered and purified together with the hydrogen gas evolved in the electrolytic reduction steps and can be used as fuel hydrogen for use in fuel cells, as described hereinbelow.

EXAMPLES

The present invention is to be explained further with reference to examples and test examples. The examples and test examples were conducted using the electrolysis apparatus as shown in FIG. 2. Details of the electrolysis vessel are described below.

Operation conditions in each of the steps and the recovery percentage for each element (% by weight based on the amount of each element in the simulated nitric acid solution tested) are summarized in Table 1. Each of the electrolytic operations was conducted at normal temperatures and normal pressures. The addition amount of $Pd^{2+}$ as a catalyst in the step A was set so as to be higher than the concentration for each of the elements contained in the simulated nitric acid solution.

TABLE 1

| Step | Operation condition | Recovery percentage (%) | | | | | | |
|---|---|---|---|---|---|---|---|---|
| | | Pd | Se | Te | Ru | Re | Zr | Mo |
| Step A [Collective deposition] | Nitric acid conc.: 2.5M 500 mA/cm$^2$ 360 min $Pd^{2+}$ nitric acid solution added | 91.9 | 98.1 | 97.7 | 58.3 | 25.3 | 8.9 | 15.6 |
| In high level liquid wastes | | 8.1 | 1.9 | 2.3 | 41.7 | 74.7 | 91.1 | 84.4 |
| Step B [Collective dissolution] | Nitric acid conc.: 5M 1.5 V 180 min | 82.4 | 71.5 | 84.4 | 40.8 | 8.6 | 5.4 | 13.6 |
| In insoluble Residue | | 9.5 | 26.6 | 13.3 | 17.5 | 16.7 | 3.5 | 2.0 |
| Step C | Nitric acid conc.: 2M 25 mA/cm$^2$ 180 min | 82.2 | 45.1 | 10.6 | 2.3 | 0 | 0.3 | 0.4 |
| Step E | Nitric acid conc.: 2M 100 mA/cm$^2$ 360 min, nitric acid solution added | 0.2 | 25.0 | 31.6 | 8.4 | 1.2 | 0.1 | 0.9 |
| Step G | Nitric acid conc.: 2M 500 mA/cm$^2$ 360 min | 0 | 1.3 | 40.9 | 24.0 | 6.4 | 2.8 | 11.6 |
| In liquid wastes | | 0 | 0.1 | 1.4 | 6.1 | 1.0 | 2.3 | 0.7 |

Anode chamber and cathode chamber:
  100 mL volume, made of PTFE
Anode and Cathode:
  platinum-plated/titanium (titanium on which platinum is plated), 20 cm$^2$
Diaphragm:
  perfluoro series sulfonic acid membrane (commercial name: "Nafion 450", manufactured by DuPont Co.)
Pipings:
  made of tetrafluoroethylene-perfluoroalkyl vinyl ether copolymer The metal ion concentration in nitric acid solutions was measured by ICP emission spectrochemical analysis.

EXAMPLE

An example for conducting a method of separating and recovering rare FP according to the present invention as shown in FIG. 1 is to be described below.

As the nitric acid solution to be processed, a simulated nitric acid solution containing the following elements as rare FP in spent nuclear fuels was used. In this example, $ReO_4^-$ was used as simulated ions for $TcO_4^-$. Re (rhenium) is an element, similar to Tc, belonging to the group 7A of the periodic table and both of hepta valent $TcO_4^-$ and $ReO_4^-$ are stable in a nitric acid solution and both of them exhibit identical electrochemical behavior.

Nitric acid concentration of the simulated nitric acid solution: 2.5M

Element contained: $Pd^{2+}$, $Se^{4+}$, $Te^{4+}$, $RuNO^{3+}$, $ReO_4^-$ ($TcO_4^-$), $Zr^{4+}$, $Mo^{6+}$ As can be seen from Table 1, 90% or more of Pd, Se and Te, about 60% of Ru and about 25% of Re (Tc) can be deposited from the simulated nitric acid solution on the cathode and separated in the step A. Further, there can be finally recovered about 82% of Pd in the step C, 25 to 32% of Se and Te in the step E and 6 to 24% of Re (Tc) and Ru in the step G.

Test Example 1

Effect of Addition of Catalyst in Step A $Pd^{2+}$ or $Fe^{2+}$ was added as a catalyst in the simulated nitric acid solution containing rare FP and a collective deposition and recovery test for the rare FP was conducted. For the comparison, the same test was conducted also for the simulated nitric acid solution with no addition of the catalyst. The result obtained is shown in Table 2.

The test conditions were as follows:

Nitric acid concentration of the simulated nitric acid solution:
  Initial value 2.5 M, upon completion of electrolysis 0.5 M Addition amount of catalyst:
  $Pd^{2+}$ 0.34 g (total addition amount during 90 to 360 min from the start of electrolysis),
  $Fe^{2+}$ 0.45 g (collectively added upon start of electrolysis)

Current density: 500 mA/cm$^2$

Electrolytic reduction time: 360 min

TABLE 2

|  | Pd | Se | Te | Ru | Rh | Re | Mo (precipitated) | Zr (precipitated) |
|---|---|---|---|---|---|---|---|---|
| Without addition | 98.7 | 78.04 | 77.68 | 31.44 | 57.39 | 40.37 | 65.97 | 34.23 |
| $Pd^{2+}$ added | 96,98 | 81.2 | 82.78 | 52.33 | 75.56 | 49 | 71.69 | 40.22 |
| $Fe^{2+}$ added | 96.74 | 80.74 | 82.35 | 51.95 | 83.73 | 50 | 74.57 | 37.43 |

As can be seen from Table 2, in the step A of collectively depositing the rare FP, the recovery percentage for Ru, Rh and Re (Tc) can be improved by the addition of $Pd^{2+}$ or $Fe^{2+}$ as the catalyst without significant effect on the deposition of Pd, Se and Te and precipitation of Mo and Zr.

Test Example 2

Effect of Nitric Acid Concentration

Figure 3:
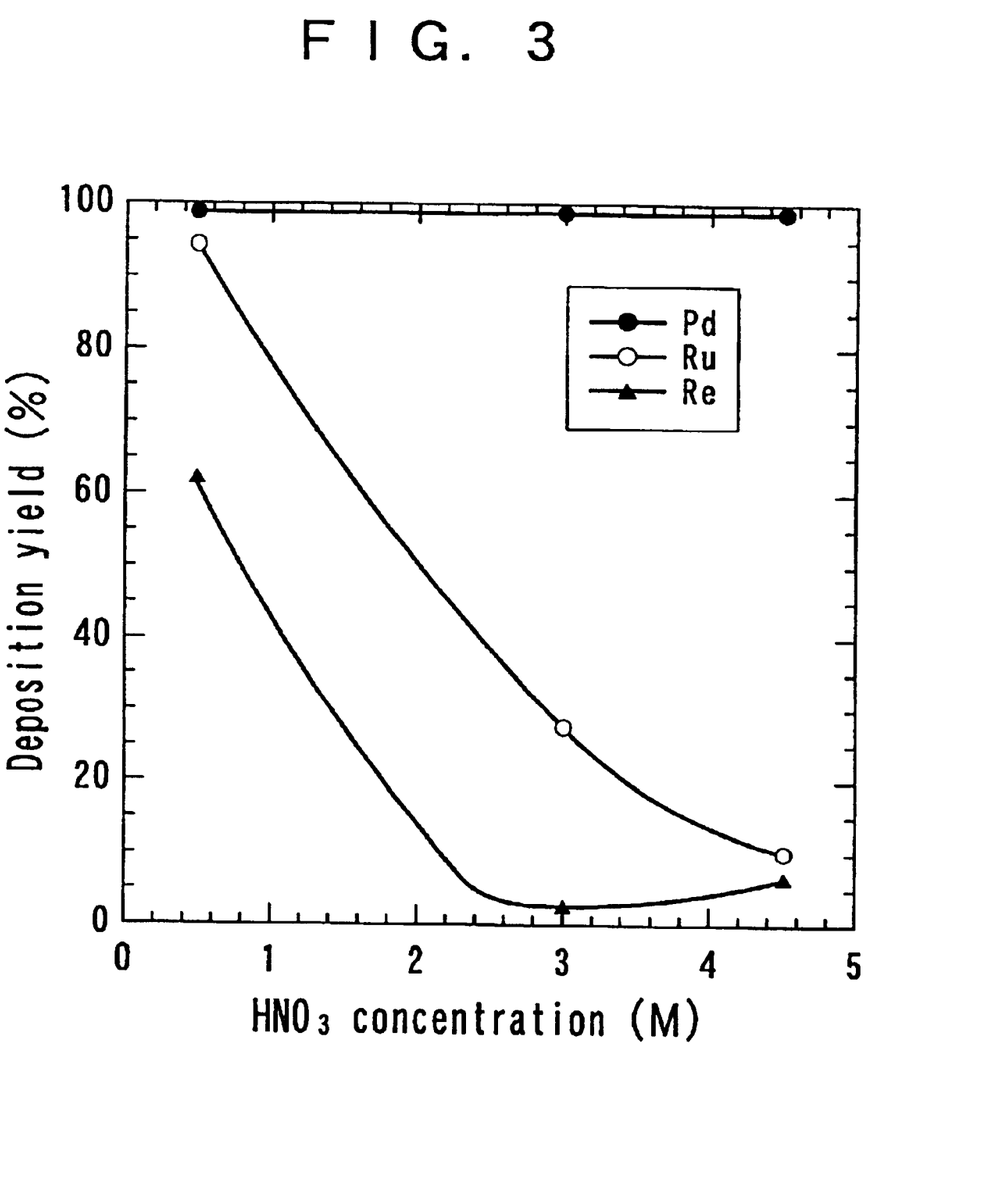
FIG. 3 is a graph showing an effect of nitric acid concentration upon deposition yield of elements on the cathode in the method of separating and recovering rare FP according to the present invention.

A simulated nitric acid solution containing Pd, Ru and Re (Tc) each at a concentration of 100 ppm was electrolytically reduced for 180 min at a current density of 500 mA/cm² while changing the nitric acid concentration within a range from 0.5 to 4.5 M and a deposition test for each element on the cathode was conducted. FIG. 3 shows a graph showing a relation between a nitric acid concentration and a deposition yield.

In each of the steps of the present invention, optimal nitric acid concentration can be selected properly in the combination of various conditions (rare element concentration, current density, electrolytic reduction time, the processed amount of the solution to be processed, etc.) within the range of 0.1 to 4.5 M for the solution to be processed. As can be seen from the graph shown in FIG. 3, it was observed a tendency that the deposition yield of Ru and Re(Tc) was improved and high deposition yield of Pd was kept as the nitric acid concentration was decreased as 0.5 M. Accordingly, for improving the deposition yield of Ru, Re(Tc) and Pd in the step A, and improving the deposition yield of Ru and Re(Tc) in the step G, it is preferred to adjust the nitric acid concentration of the solution to be processed to a relatively low concentration.

On the other hand, it is observed a tendency that codeposition of Ru and Re(Tc) is suppressed while keeping high deposition yield of Pd as the nitric acid concentration increases as 4.5 M. Accordingly, it is preferred that the concentration of the nitric acid solution in the step C in which deposition of Pd at high purity is desired is adjusted to a relatively high concentration.

Test Example 3

Effect of Current Density

Figure 4:
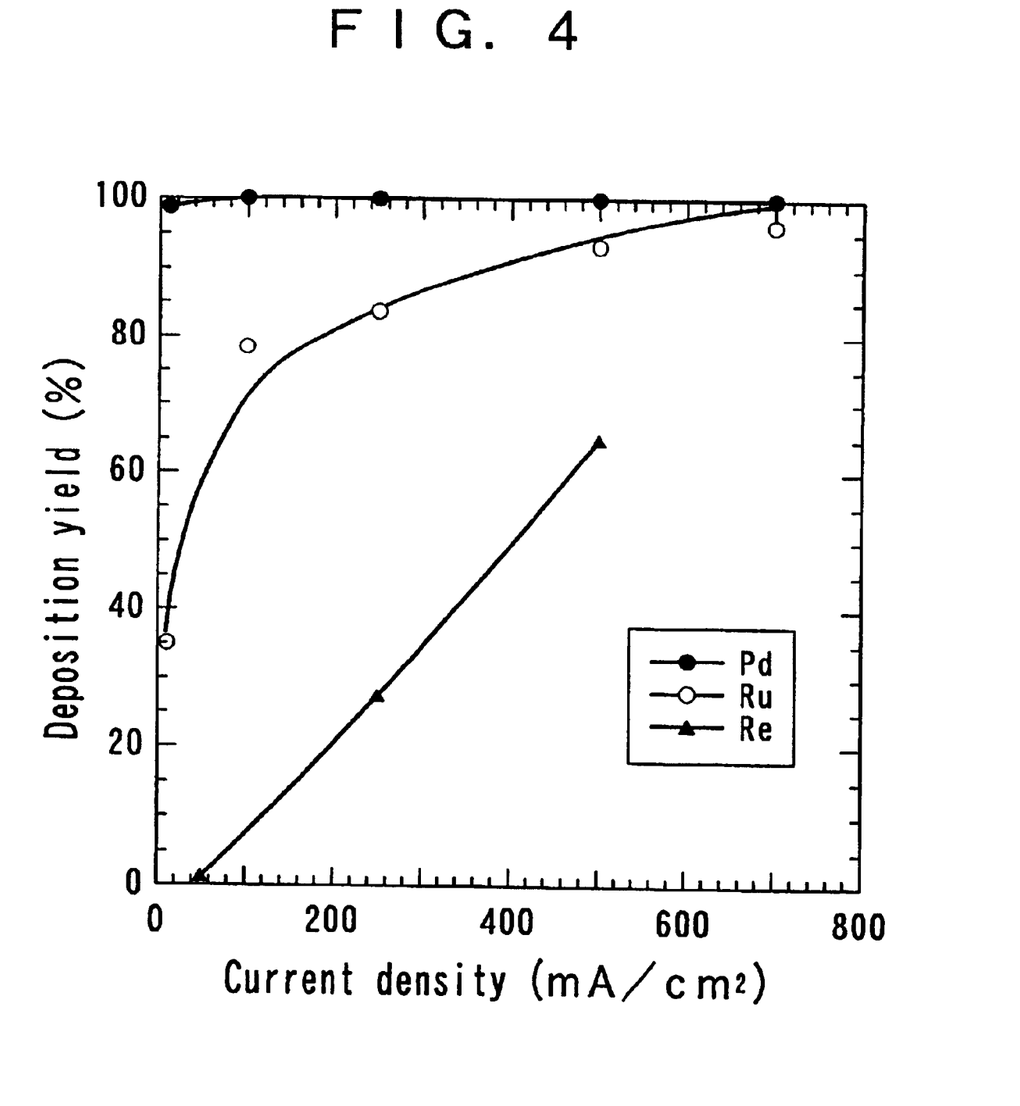
FIG. 4 is a graph showing an effect of current density upon deposition yield of elements on the cathode in the method of separating and recovering rare FP according to the present invention.

A simulated nitric acid solution containing Pd, Ru and Re (Tc) each at a concentration of 100 ppm was electrolytically reduced for 180 min at a nitric acid concentration 0.5 M, while changing the current density within a range from 10 to 700 mA/cm² and a deposition test for each element on the cathode was conducted. FIG. 4 shows a graph showing a relation between a current density and a deposition yield.

In each of the steps of the present invention, optimal value of the current density can also be selected properly based on the combination of various conditions within the range specified for each of the steps. As can be seen from the graph shown in FIG. 4, it is observed a tendency that codeposition of Ru and Re(Tc) is suppressed while maintaining the high deposition yield of Pd as the current density is lowered as 10 mA/cm². Accordingly, it can be seen that a relatively low current density may be adopted for the current density in the step C in which Pd is selectively deposited.

On the other hand, as the current density increases to 500 mA/cm², and further, to 700 mA/cm², it is observed a tendency that deposition of Re(Tc) and Ru is also improved while keeping the high deposition yield of Pd. Accordingly, it can be seen that a relatively high current density may be adopted preferably in the step A for collectively depositing Pd, Re(Tc) and Ru and in the step G in which high deposition of Re(Tc) and Ru is required.

The rare FP separated and recovered by the method described above can be utilized effectively for the technique of fuel cell power generation after subjecting them to the treatment in accordance with their respective radiochemistries to thereby attain the cooperation system for nuclear power generation and fuel cell power generation according to the present invention. The cooperation system of the present invention is to be described hereinbelow with reference to a conceptional diagram shown in FIG. 5.

Figure 5:
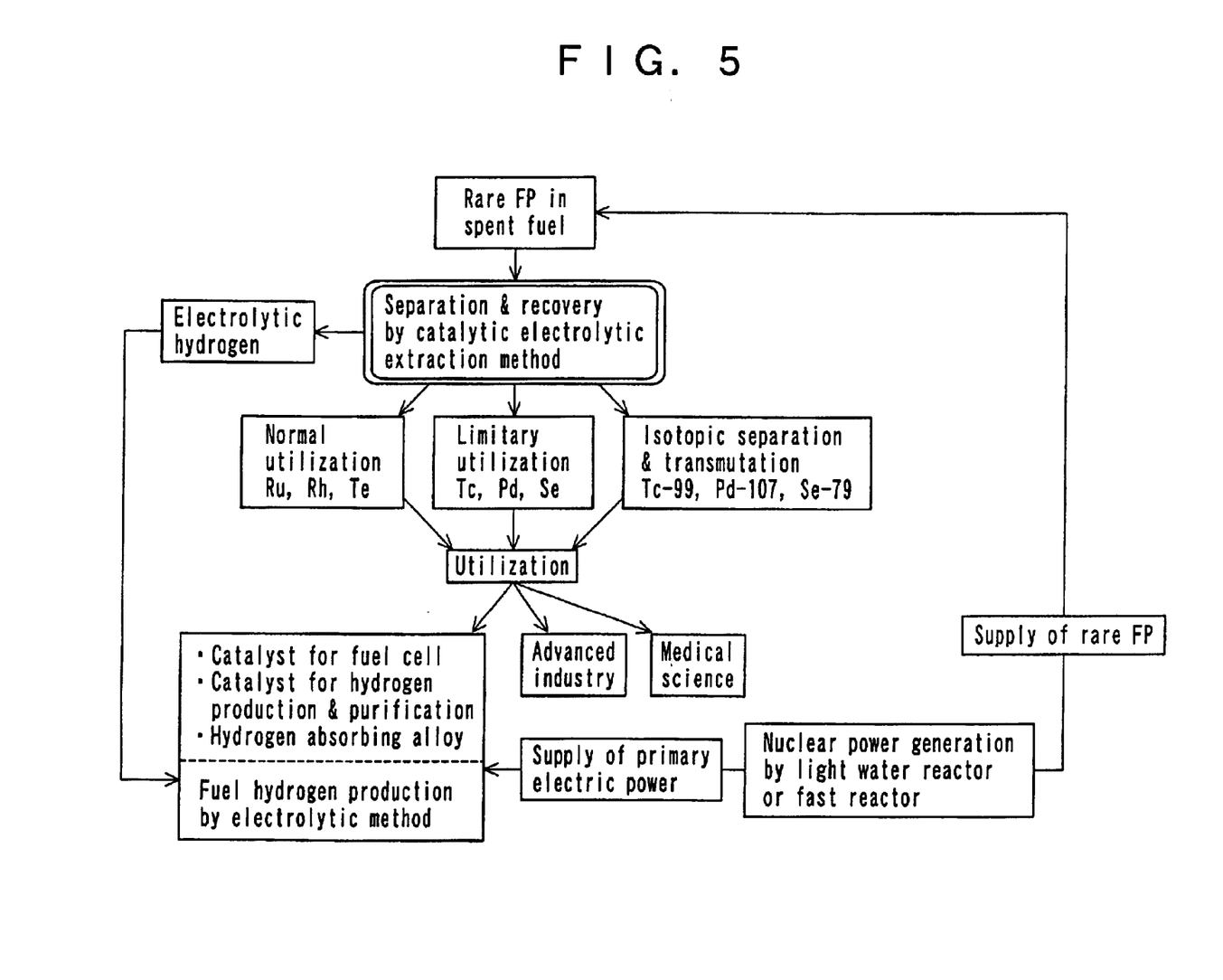
FIG. 5 is a conceptional view of a cooperation system for nuclear power generation and fuel cell power generation according to the present invention.

In FIG. 5, a block surrounded with dual lines corresponds to separation and recovery of rare FP in spent nuclear fuels according to the present invention described above, and the rare FP are supplied from spent nuclear fuels used in nuclear power generation facilities including light water reactors and fast reactors.

The rare FP separated and recovered by the method of separating and recovering rare FP according to the present invention can be put into practical use after subjecting them to the treatment in accordance with their respective radio-chemistries and can be utilized in fuel cell power generation technique, as well as in medical science or various fields of advanced industries.

The method of treating individual rare FP is generally classified into normal utilization, limitary utilization, and isotopic separation and nuclear transmutation as shown in FIG. 5. According to the normal utilization, short-lived Ru and Rh with a relatively short half-life can be decreased to such a level that the effect due to radiochemical toxicity is negligible by storage under cooling for several tens of years. For the storage control, a storage control system for the high level liquid wastes used at present can be adopted. Further, since it is known that oxygen and hydroxyl group radicals are formed by radioactive ray, radioactive rays from Ru and Rh can be utilized effectively in a system where radioactive rays from Ru and Rh act positively for the catalytic performance, by using them under shielding without storage under cooling. For Te, long-lived radioactive nuclide having $1.3 \times 10^{13}$ years of half life is present. However, the radioactivity is very low since it is ultra long-lived nuclide and the radioactive toxicity is extremely low, and thus normal utilization is possible. In the case where the effect of slight radioactive rays is not negligible, it may be used after applying a countermeasure for slight radioactive rays optionally.

Tc, Pd and Se by limitary utilization are long-lived FP including $^{99}$Tc at a half-life of $2.1 \times 10^5$ years, $^{107}$Pd at a half-life of $7 \times 10^6$ years and $^{79}$Se at a half-life of $6 \times 10^4$ years, respectively. However, since their radiochemical toxicities are extremely slight, they can be confined easily and used under β-ray shielding. Particularly for Pd, since the radiochemical toxicity thereof is extremely low as ca. 1/300 or less of uranium metal at radiation equilibrium, the radioactive countermeasure may be further slight.

Particularly for long-lived Tc-99, it may be utilized after applying nuclear transmutation by using a fast reactor or an accelerator and transformation into Ru-100 as a stable nuclide. Further, for Pd-107 and Se-79, since isotopic separation by laser or the like is possible in principle, they are separated and subjected to nuclear transmutation when the isotopic separation is put into practical use, and remaining stable nuclides can be utilized.

The present invention has an object of providing a cooperation system for nuclear power generation and fuel cell power generation and includes the following embodiments specifically for utilizing separated and recovered rare FP for the technique of fuel cell power generation.

At first, Ru can be utilized as a catalyst for an electrode material of fuel cells. That is, Ru can be used for a Pt—Ru alloy catalyst in order to enhance durability against CO poisoning of the fuel electrode (anode) material in solid polymer electrolyte fuel cells. Further, Ru can be used for a Pt—Ru alloy catalyst as the fuel electrode material for methanol-air fuel cells.

As illustrated in the method of separating and recovering the rare FP by electrolytic extraction method shown in FIG. 1, Sr remaining in high level liquid wastes not depositing in the step of collectively depositing the platinum group elements, Tc, Ag, Se and Te on the cathode by electrolytic reduction (step A) can be separated and recovered by using known crown ether (18-crown-6) or a selective extracting agent (1,2-benzenebis(1,4-dioxanonyl-6,8-dionate) metal complex) as described in Japanese Patent No. 3059628. The thus recovered Sr can be used for a perovskite type oxide $La_{1-x}Sr_xMnO_3$ (x=0.1 to 0.2) as an air electrode (cathode) material for solid oxide fuel cells.

Ru, Rh and Pd can be utilized as a catalyst for production and purification of fuel hydrogen in fuel cell power generation. That is, Ru and Rh can be used upon production of hydrogen from hydrocarbon utilizing the steam reforming reaction. Ru and Rh have an excellent catalytic activity compared with Ni catalyst used so far. Further, Rh can be used as a water electrolysis catalyst of solid polymer electrolyte upon production of hydrogen by electrolysis of water. Furthermore, Ru and Rh are used for producing semiconductor photocatalyst $TiO_2(a)$-$RuO_2$ or $TiO_2(a)$-Rh for production of hydrogen by photolysis of water. Further, Pd is used for the production of a Pd alloy membrane for production of pure hydrogen. Furthermore, Pd is used for the production of an Mg—Pd laminated alloy as a hydrogen absorbing alloy used for the storage of fuel hydrogen.

A preferred embodiment in the cooperation system of nuclear power generation and fuel cell power generation shown in FIG. 5 is the use of primary electric power supplied by nuclear power generation as, for example, an electric power for the production of fuel hydrogen by electrolytic method. Further, in the method according to the present invention for separating and recovering the rare FP from spent nuclear fuels by an electrolytic extraction method, hydrogen evolved in the electrolytic reduction steps and a hydrogen gas formed by radiolysis of the high level nitric acid solution to be processed can be used as fuel hydrogen for use in fuel cell power generation.

As described above, the nuclear power generation (centralized type) and the fuel cell power generation (distributed type) can be put to a cooperation system by efficiently supplying and utilizing two basic substances of fuel hydrogen and catalyst substance for produce and use hydrogen in fuel cell power generation. This enables to establish a persistent clean energy system sloughing off power generation with fossil fuel that releases gaseous carbon dioxide causing global warming.

The rare FP separated and recovered according to the present invention can be utilized also to the field of solar power generation which is a source of soft energy similar to the fuel cell power generation, although this has no direct relevance to the fuel cell power generation. That is, Se and Te can be used for $Cu(InGa)Se_2$ series and CdTe series membrane solar cells as compound semiconductor solar cells. Further, Ru can be used as dye complex $RuL_2(NCS)_2$ in dye sensitized wet solar cells.

As can be seen from the foregoing, according to the present invention, useful rare FP contained in spent nuclear fuels can be separated and recovered at a high recovery percentage, by using a constant current electrolysis which is relatively simple and convenient in view of operation and can be simplified in view of the structure of the electrolysis vessel, and by combining operation parameters for current density and nitric acid concentration.

Further, by utilizing the recovered useful rare FP as the electrode material in fuel cells or as catalyst for production and purification of fuel hydrogen, a cooperation system for nuclear power generation and fuel cell power generation can be provided to enable establishment of a clean energy system sloughing off power generation with fossil fuel that releases gaseous carbon dioxide causing global warming.

What is claimed is:

1. A method of separating and recovering rare FP in spent nuclear fuels comprising:
   a step A of supplying a nitric acid solution to be processed at a nitric acid concentration of 0.1 to 4.5 M containing one or more of rare FP (fission products) selected from the group consisting of platinum group elements, Ag (silver), Tc (technetium), Se (selenium) and Te (tellurium) generated from a reprocessing step of spent nuclear fuels used in nuclear power generation facilities including light water reactors or fast reactors, to a cathode chamber together with $Pd^{2+}$ (palladium) or $Fe^{2+}$ (iron) as a catalyst, and conducting electrolytic reduction at a current density of 1 to 3000 mA/cm$^2$ while supplying a pure nitric acid solution at a nitric acid concentration of 0.1 to 4.5 M to an anode chamber, thereby collectively depositing Ru (ruthenium), Rh (rhodium) and Pd as platinum group elements, and Ag, Tc, Se and Te in the nitric acid solution to be processed on the cathode;
   a step B of switching the cathode to the anode and conducting electrolytic oxidation at a set potential of 1.5 to 3 V while supplying a pure nitric acid solution at a nitric acid concentration of 3 to 5 M, thereby collectively dissolving the deposits on the electrode into the pure nitric acid solution;
   a step C of switching the anode to the cathode and conducting electrolytic reduction at a current density of 1 to 25 mA/cm$^2$ while supplying the deposit-dissolved nitric acid solution at a nitric acid concentration of 0.1 to 4.5 M to the cathode chamber and supplying a pure nitric acid solution at a nitric acid concentration of 0.1 to 4.5 M to the anode chamber, thereby selectively depositing Pd and Ag in the deposit-dissolved nitric acid solution on the cathode;

a step D of switching the cathode to the anode and conducting electrolytic oxidation at a set potential of 1.5 to 3 V while supplying a pure nitric acid solution at a nitric acid concentration of 3 to 5 M, thereby dissolving the deposits Pd and Ag on the electrode into the pure nitric acid solution and recovering them;

a step E of switching the anode to the cathode and conducting electrolytic reduction at a current density of 25 to 100 mA/cm$^2$ while supplying the deposit-dissolved and Pd.Ag-removed nitric acid solution at a nitric acid concentration of 0.1 to 4.5 M to the cathode chamber and supplying a pure nitric acid solution at a nitric acid concentration of 0.1 to 4.5 M to the anode chamber, thereby selectively depositing Se and Te in the deposit-dissolved and Pd.Ag-removed nitric acid solution on the cathode;

a step F a switching the cathode to the anode and conducting electrolytic oxidation at a set potential of 1.5 to 3 V while supplying a pure nitric acid solution at a nitric acid concentration of 3 to 5 M, thereby dissolving the deposits Se and Te on the electrode into the pure nitric acid solution and recovering them;

a step G of switching the anode to the cathode and conducting electrolytic reduction at a current density of 100 to 700 mA/cm$^2$ while supplying the deposit-dissolved and Pd.Ag.Se.Te-removed nitric acid solution at a nitric acid concentration of 0.1 to 4.5 M to the cathode chamber and supplying a pure nitric acid solution at a nitric acid concentration of 0.1 to 4.5 M to the anode chamber, thereby selectively depositing Ru, Rh and Tc in the deposit-dissolved and Pd.Ag.Se.Te-removed nitric acid solution on the cathode; and a step H of switching the cathode to the anode and conducting electrolytic oxidation at a set potential of 1.5 to 3 V while supplying a pure nitric acid solution at a nitric acid concentration of 3 to 5 M, thereby dissolving deposits Ru, Rh and Tc on the electrode into the pure nitric acid solution and recovering them.

2. A method of separating and recovering rare FP in spent nuclear fuels according to claim 1, wherein a reducing agent is added to the deposit-dissolved nitric acid solution, which is supplied to the cathode chamber in the step C.

3. A method of separating and recovering rare FP in spent nuclear fuels according to claim 1, wherein a portion of Pd recovered in the step C is used as the catalyst Pd$^{2+}$ in the step A.

4. A method of separating and recovering rare FP in spent nuclear fuels according to claim 1, wherein the remaining solution of the deposit-dissolved and Pd.Ag.Se.Te-removed nitric acid solution obtained in the step G is circulated to the step A and supplied together with the nitric acid solution to be processed containing the rare FP to the cathode chamber.

* * * * *